(12) United States Patent
Park et al.

(10) Patent No.: US 9,654,395 B2
(45) Date of Patent: May 16, 2017

(54) SDN-BASED SERVICE CHAINING SYSTEM

(71) Applicant: KULCLOUD, Seongnam-si, Gyeonggi-do (KR)

(72) Inventors: Suengyoung Park, Yongin-si (KR); Dipjyoti Saikia, Seongnam-si (KR); Seokhwan Kong, Yongin-si (KR)

(73) Assignee: KULCLOUD, Seongnam-si, Gyeonggi-do (KR)

( * ) Notice: Subject to any disclaimer, the term of this patent is extended or adjusted under 35 U.S.C. 154(b) by 1 day.

(21) Appl. No.: 14/890,319

(22) PCT Filed: Mar. 31, 2014

(86) PCT No.: PCT/KR2014/002750
§ 371 (c)(1),
(2) Date: Nov. 10, 2015

(87) PCT Pub. No.: WO2015/152436
PCT Pub. Date: Oct. 8, 2015

(65) Prior Publication Data
US 2016/0080263 A1  Mar. 17, 2016

(51) Int. Cl.
*H04L 12/741* (2013.01)
*H04L 12/64* (2006.01)
(Continued)

(52) U.S. Cl.
CPC ...... *H04L 45/745* (2013.01); *G06F 17/30345* (2013.01); *G06F 17/30424* (2013.01);
(Continued)

(58) Field of Classification Search
CPC ... H04L 45/745; H04L 12/6418; H04L 45/64; H04L 49/25; H04L 45/42; H04L 49/35;
(Continued)

(56) References Cited

U.S. PATENT DOCUMENTS 9,270,618 B2 *  2/2016  DeCusatis .............. H04L 49/25
9,363,180 B2 *  6/2016  Beliveau ............ H04L 45/7453
(Continued)

FOREIGN PATENT DOCUMENTS

WO     2012-096457 A    7/2012

OTHER PUBLICATIONS

International Search Report for PCT/KR2014/002750 mailed Dec. 15, 2014 from Korean Intellectual Property Office.
(Continued)

*Primary Examiner* — Luat Phung
*Assistant Examiner* — Thomas R Cairns
(74) *Attorney, Agent, or Firm* — Paratus Law Group, PLLC

(57) ABSTRACT

A method for providing service chaining in a software-defined network (SDN)-based network system, the method including: receiving, at a controller, a first packet-in message from a first switch of a plurality of switches, which has received a service request packet from a user, to indicate that the first switch does not have a corresponding entry in a field extracted from the service request packet; extracting from the packet-in message both a service identifier that identifies a type of a service requested through the service request packet and a user identifier that identifies the user; and searching an entry database for an entry list that enables the service request packet to be forwarded to a network function list that corresponds to the service identifier and the user identifier, with reference to a service table, a user table, and a network function table which are associated with one another.

17 Claims, 10 Drawing Sheets

(51) Int. Cl.
*G06F 17/30* (2006.01)
*H04L 12/947* (2013.01)
*H04L 12/715* (2013.01)
*H04L 12/931* (2013.01)
*H04L 12/717* (2013.01)

(52) U.S. Cl.
CPC .... *G06F 17/30867* (2013.01); *H04L 12/6418* (2013.01); *H04L 45/64* (2013.01); *H04L 49/25* (2013.01); *H04L 45/42* (2013.01); *H04L 49/35* (2013.01)

(58) Field of Classification Search
CPC ......... G06F 17/30345; G06F 17/30424; G06F 17/30867
See application file for complete search history.

(56) References Cited

U.S. PATENT DOCUMENTS

| | | |
|---|---|---|
| 2013/0010600 A1 | 1/2013 | Jocha et al. |
| 2013/0163427 A1 | 6/2013 | Beliveau et al. |
| 2013/0272305 A1 | 10/2013 | Lefebvre et al. |
| 2013/0294314 A1 | 11/2013 | Lee et al. |
| 2013/0318243 A1 | 11/2013 | Chinthalapati et al. |
| 2013/0322443 A1 | 12/2013 | Dunbar et al. |
| 2016/0119256 A1* | 4/2016 | Wang ................... H04L 12/6418 370/401 |
| 2016/0173378 A1* | 6/2016 | Ni ....................... H04L 12/6418 370/392 |

OTHER PUBLICATIONS

Park, Sangmin et al. 'A Study on Research Trends in Stability and Scalability of SDN Controller', Domestic Conference of Korean Institute of Communications & Information Sciences, Jun. 2013, pp. 317-318.
OpenFlow Switch Specification, Oct. 14, 2013, version 1.4.0(Wire Protocol 0x05), The Open Networking Foundation.
Software-Defined Networking: The New Norm for Networks, Apr. 13, 2012, ONF White Paper, The Open Networking Foundation.
Written Opinion of the International Searching Authority for PCT/KR2014/002750 mailed from ISA/KR on Dec. 15, 2014.

* cited by examiner

SDN-BASED SERVICE CHAINING SYSTEM

CROSS REFERENCE TO PRIOR APPLICATION

This application is a National Stage Patent Application of PCT International Patent Application No. PCT/KR2014/002750 (filed on Mar. 31, 2014) under 35 U.S.C. §371, which is hereby incorporated by reference in their entirety.

BACKGROUND

1. Field

The following description relates to a method for providing service chaining in a software-defined network (SDN)-based network, and to a method for providing service chaining which provides an optimal network path to each service, provides appropriate network functions according to traffic state, provides easy management, dynamically implements service chaining, as well as implements automatic operation of the service chaining

2. Description of the Related Art

In the existing network, a network path is set to static for service hosting, so the network has to be manually reconfigured according to changes in network state. The relevant processes are very complex. In particular, for service chaining in which specialized network for each service is built and managed, the reconfiguration process is much more complex than in a general network. Therefore, in service chaining, it is close to impossible to provide an optimal network to each service.

RELATED ART DOCUMENT

Non-Patent Documents

1. OpenFlow Switch Specification version 1.4.0(Wire Protocol 0x05), Oct. 14, 2013 [https://www.opennetworking.org/images/stories/downloads/sdn-resources/onf-specifications/openflow/openflow-spec-v1.4.0.pdf]
2. Software-Defined Networking: The New Norm for Networks, ONF White Paper, Apr. 13, 2012 [https://www.opennetworking.org/images/stories/downloads/sdn-resources/white-papers/wp-sdn-newnorm.pdf]

SUMMARY

The following description relates to a method for providing service chaining in a software-defined network (SDN)-based network, which utilizes an SDN to provide a network path optimized according to a service level agreement (SLA) between a service provider and a user.

By dynamically operating a network according to services, change in network state, or SLA of each service, the method can provide an optimal service to each user, and enables a network provider to automatically operate the system and to easily charge the user based on the type of service or the amount of usage, without using a mobile communication network.

In one general aspect, there is provided a method for providing service chaining in a software-defined network (SDN)-based network system which includes a plurality of switches and a controller to control the plurality of switches, the method including: receiving, at the controller, a first packet-in message from a first switch of the plurality of switches, which has received a service request packet from a user, to indicate that the first switch does not have a corresponding entry in a field extracted from the service request packet; extracting from the packet-in message both a service identifier that identifies a type of a service requested through the service request packet and a user identifier that identifies the user; and searching an entry database (DB) for an entry list that enables the service request packet to be forwarded to a network function list that corresponds to the service identifier and the user identifier, with reference to a service table, a user table, and a network function table which are associated with one another.

In another general aspect of the present invention, there is provided an SDN controller connected to a plurality of SDN-based switches via OpenFlow protocol and controlling the plurality of switches, the SDN controller including: a switch communicator configured to receive a first packet-in message from a first switch of the plurality of switches, which has received a service request packet from a user, to indicate that the first switch does not have a corresponding entry in a field extracted from the service request packet; an identifier extractor configured to extract from the packet-in message both a service identifier that identifies a type of a service requested through the service request packet and a user identifier that identifies the user; a service table enumerating services available to be provided; a user table comprising a plurality of user list, each user list being associated with each available service in the service table; a network function table comprising a plurality of network function lists, each network function list being associated with each user list of the user table; a topology table comprising information about a network topology; an entry DB configured to store entries that enable appropriate packet forwarding to be performed in the plurality of switches; and an entry manager configured to determine whether an entry list that enables the service request packet to be forwarded to a network function list that corresponds to both the service identifier and the user identifier is present in the entry DB, with reference to a service table, a user table, and a network function table which are associated with one another.

Other features and aspects will be apparent from the following detailed description, the drawings, and the claims.

DETAILED DESCRIPTION

Figure 1:
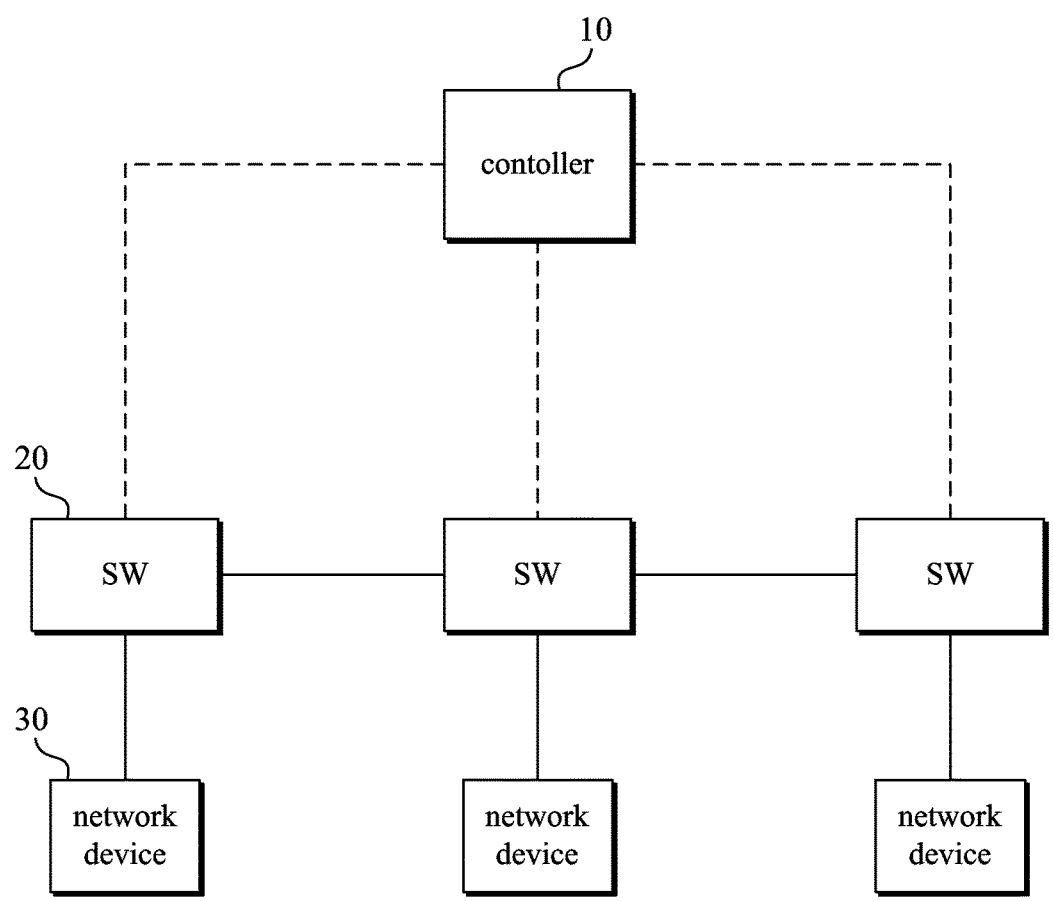
FIG. 1 is a block diagram illustrating a software-defined network (SDN) system according to an exemplary embodiment of the present invention.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise.

When an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. In addition, it is understood that when a first element is connected to or accesses a second element in a network, the first element and the second element can transmit and receive data therebetween.

In the following description, usage of suffixes such as 'module' or 'unit' used for referring to elements is given merely to facilitate explanation of the present invention, without having any significant meaning by itself Thus, the 'module' and 'unit' may be used together.

When the elements described herein are implemented in the actual applications, two or more elements may be combined into a single element, or one element may be subdivided into two or more elements, as needed. Throughout the drawings and the detailed description, unless otherwise described, the same drawing reference numerals are understood to refer to the same elements, features, and structures.

Figure 2:
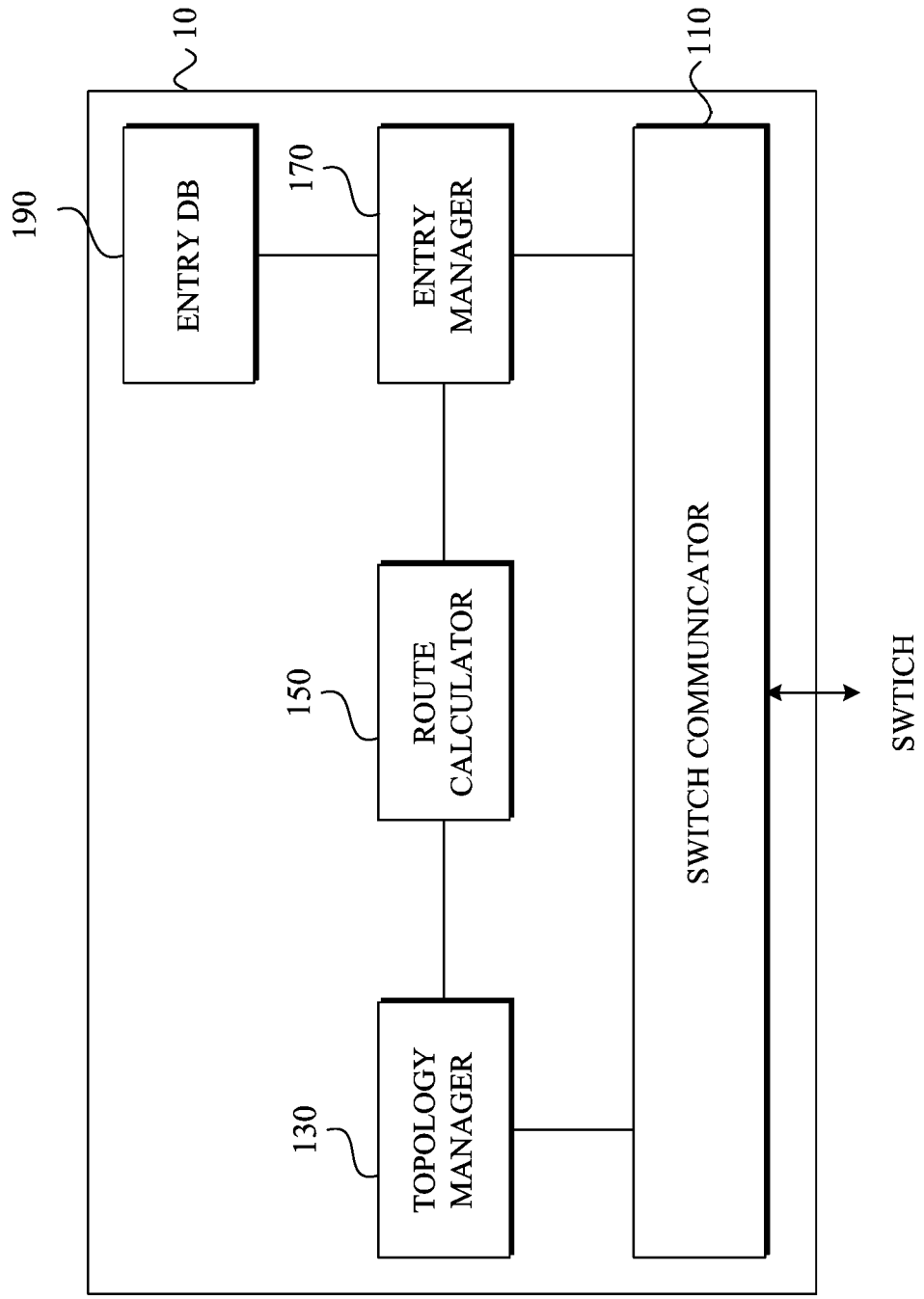
FIG. 2 is a block diagram illustrating a controller of the SDN system of FIG. 1.
Figure 3:
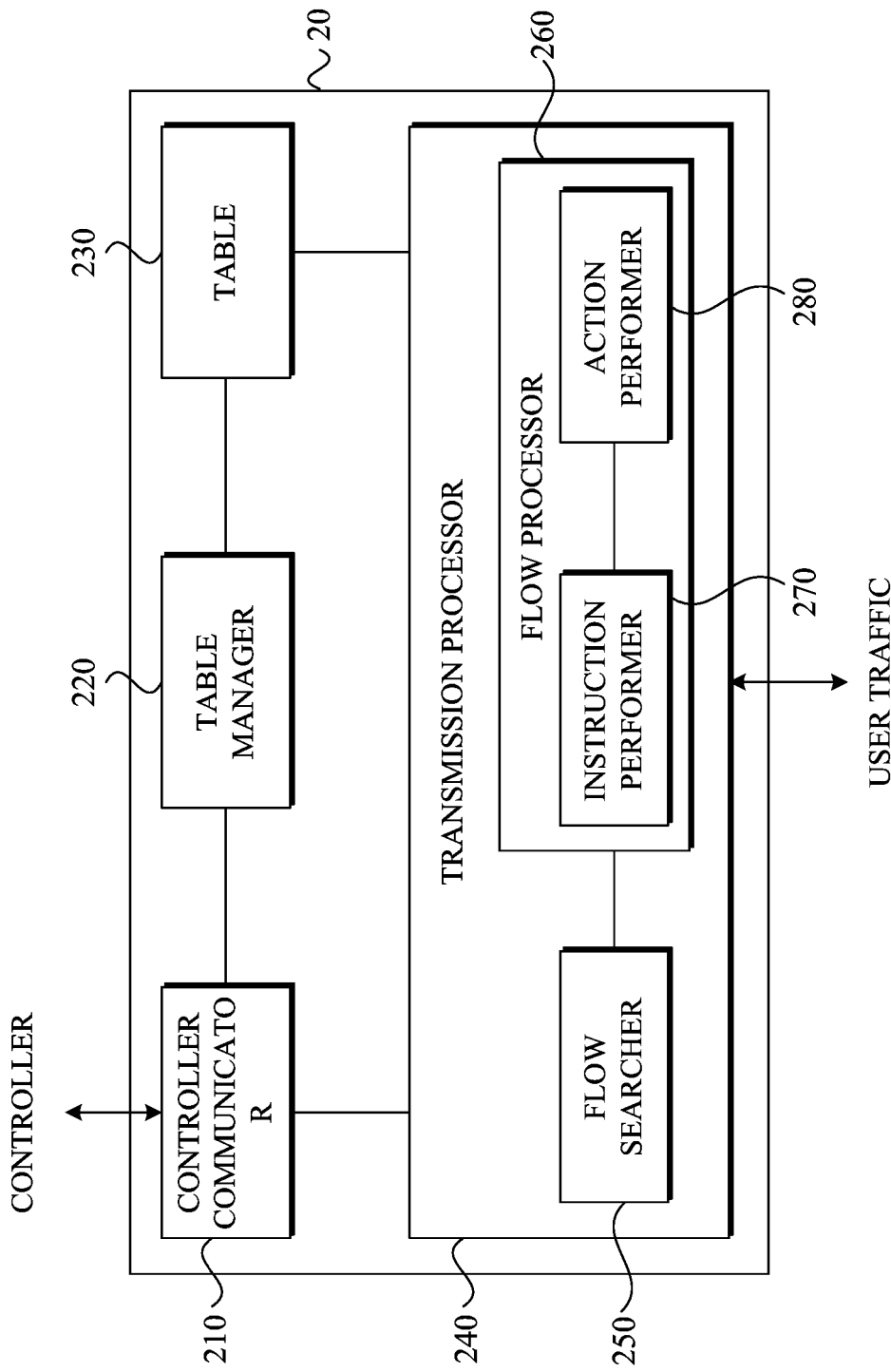
FIG. 3 is a block diagram illustrating a switch of the SDN system of FIG. 1.

FIG. 1 is a block diagram illustrating a software-defined network (SDN) system according to an exemplary embodiment of the present invention; FIG. 2 is a block diagram illustrating a controller of the SDN system of FIG. 1; and FIG. 3 is a block diagram illustrating a switch of the SDN system of FIG. 1.

Referring to FIG. 1, the SDN system may include a controller 10, a plurality of switches 20, and a plurality of network devices 30.

The network devices 30 may include user terminal devices to transmit and receive data or information therebetween or physical devices or virtual devices that perform specific functions. In hardware-oriented view, the network devices 30 may be personal computers, client terminals, servers, workstations, super computers, mobile communication terminals, smartphones, or smart pads. In addition, the network devices 30 may be virtual machines generated on physical devices. The network devices 30 may perform various network functions. The network functions may include anti-DDos, an intrusion detection system (IDS)/intrusion prevention system (IPS), an integrated security service, a virtual private network service, an anti-virus function, an anti-spam function, security service, an access management service, a firewall, a load balancing function, a QoS function, video optimization, and so on. These network functions can be virtualized. Network function virtualization (NFV) may be used to dynamically generate L4-7 service connections for each tenant to provide required network functions, or in the case of DDoS attack, the NFV may be used to quickly provide policy-based required firewall, IPS and/or deep packet inspection (DPI) functions as service chaining In addition, the NFV is able to easily turn on or off firewall or IDS/IPS, and automatically perform provisioning. The NFV may reduce the need of over-provisioning.

The controller 10 is a type of command computer that controls the SDN system, and may perform various, complex functions, for example, routing, policy statement, and security check. The controller 10 may define a flow of packets in the plurality of switches 20. For the flow allowed by the network policy, the controller 10 may calculate a route (data path) for the flow to take with reference to the network topology, and allow an entry for said flow to be set on the route. The controller 10 may communicate with the switches 20 using a particular protocol, for example, OpenFlow protocol. Communication channels between the controller 10 and each switch 20 may be encrypted with secure sockets layer (SSL).

Referring to FIG. 2, the controller 10 may include a switch communicator 110 to communicate with the switches 20, a topology manager 130, a route calculator 150, an entry manager 170, and an entry database (DB) 190 to store flow entries.

The topology manager 130 may establish and manage network topology information based on access relationship of the switches 20 collected by the switch communicator 110.

The route calculator 150 may obtain both a transmission path of packets that have been received through the switch communicator 110 and an action column to be executed on the switch 20 on the transmission path, based on the network topology information established by the topology manager 130.

The entry manager 170 may register the calculation result from the route calculator 150 as a flow entry in the entry DB 190, and may respond to a request from the switch 10 to add or update a flow entry or entries.

The switches 20 may be physical switches or virtual switches. The switches 20 may relay a flow between network devices 30 by processing received packets. To this end, each switch 20 may be provided with either one flow table or multiple flow tables for pipeline processing which is specified in non-patent document 1.

The flow table may include flow entries that define rules for processing a flow of network devices 30.

The flow may indicate a flow of packets from one switch which share at least one common header field value, or a packet flow on a particular route created by the combination of various flow entries of multiple switches. An OpenFlow network enables route control, recovery from failure, load balancing, and optimization to be performed on a flow-by-flow basis.

The switches 20 may be classified into edge switches (i.e., ingress switches and egress switches) at the entry and exit of the flow and core switches between the edge switches.

Referring to FIG. 3, each switch 20 may include a controller communicator 210 to communicate with the controller 10, a table manager 220 to manage a table 230, and a transmission processor 240.

The table 230 may include a flow table, a group table, and a metatable. The flow table may consist of multiple flow tables for pipeline processing. A flow entry in the flow table may include tuples, such as match fields, counters, timeouts, an opaque-type cookie, instructions, actions, and priority, wherein the match fields describe conditions (matching rules) to match against packets, the counters are updated when there is a packet that matches the entry, the timeouts specify an amount of time before the flow is expired by the switch, the cookie is an opaque data value chosen by the controller, the instructions include change of a packet described in the flow entry, update of an action set, and metadata update, and the actions are taken to forward a packet to a specified port or multiple ports or drop the packet.

The table manager 220 may add an entry received from the controller 10 through the controller communicator 210 to an appropriate table, or regularly remove an entry from the time table when its timeout is exceeded.

The transmission processor 240 may include a flow searcher 250 and a flow processor 260.

The flow searcher 250 may extract flow information from a packet received as user traffic. The flow information may contain identification information of an ingress port that is an incoming port of an edge switch, identification information of the incoming port of the switch, packet header information (IP addresses, MAC addresses, ports, and VLAN information regarding source and destination), and metadata. The metadata may be data that has been selectively added from previous tables or added from other switches. The flow searcher 250 may search the table 230 for a flow entry that matches the received packet with reference to the extracted flow information. If a matching flow entry is found, the flow search module 220 may request the flow processor 260 to process the received packet according to the found flow entry. If failing to find the matching flow entry, the flow search module 220 may forward the received packet or the minimum data of the received packet to the controller 10 through the controller communicator 210.

The flow processor 260 may process an action to output the packet to a specified port or multiple ports according to procedures described in the entry found by the flow searcher 250, drop the packet, or modify a specific header field of the received packet.

The flow processor 260 may include an instruction performer 270 to execute an instruction to process a pipeline process of the flow entry or to modify an action, and an action performer 280 to execute an action set when it is not possible to proceed to the subsequent table of multiple flow tables.

Although not illustrated in FIG. 1, the SDN system may further include an orchestrator that generates, modifies, and deletes a virtual network device, a virtual switch, and the like. When generating a virtual network device, the orchestrator may provide the controller 10 with information regarding the network device, such as, identification information of a switch for the virtual network to access, identification information of a port connected to the switch, an MAC address, an IP address, tenant identification information, and network identification information.

Figure 4:
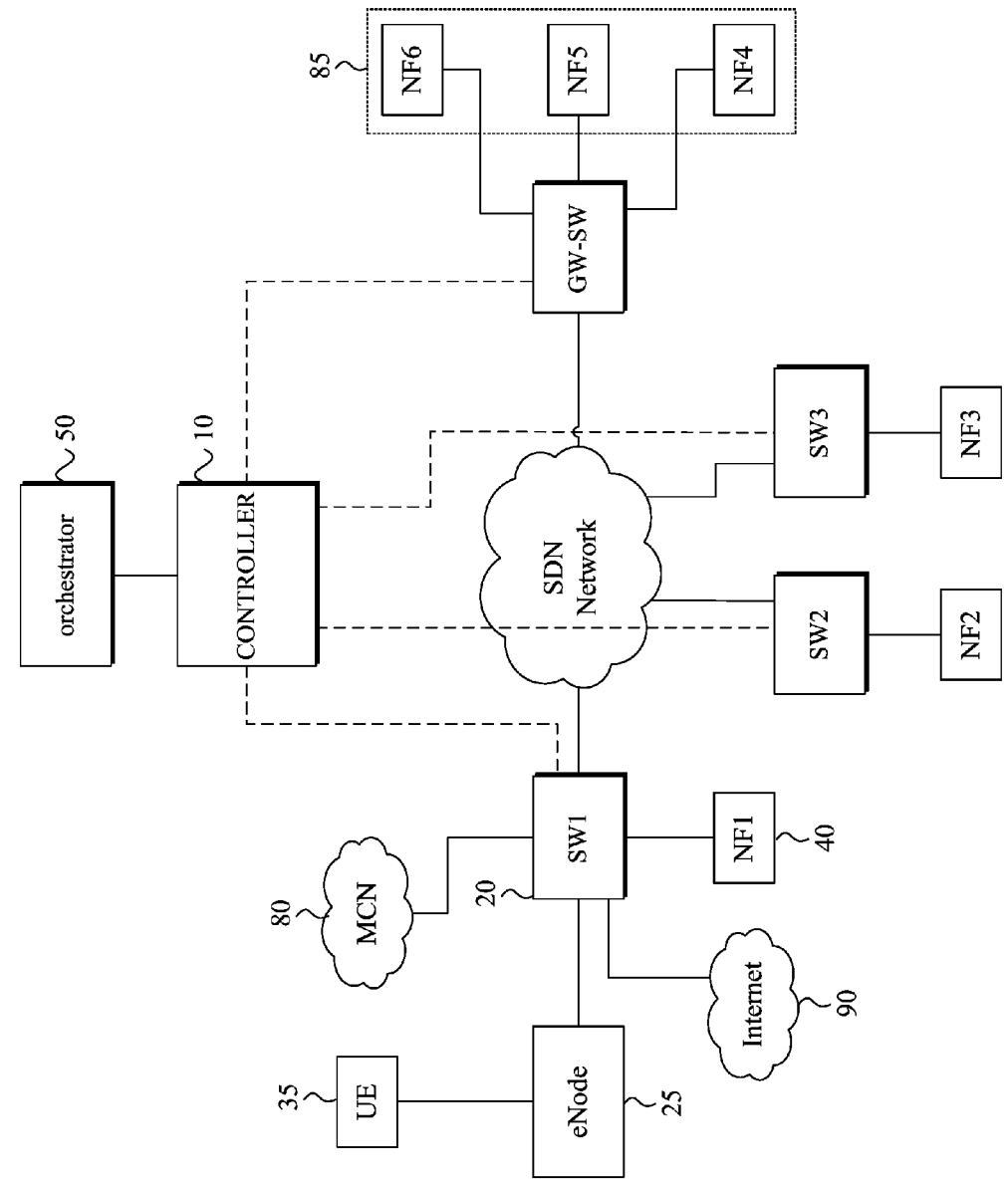
FIG. 4 is a block diagram illustrating an SDN system according to another exemplary embodiment of the present invention.
Figure 5:
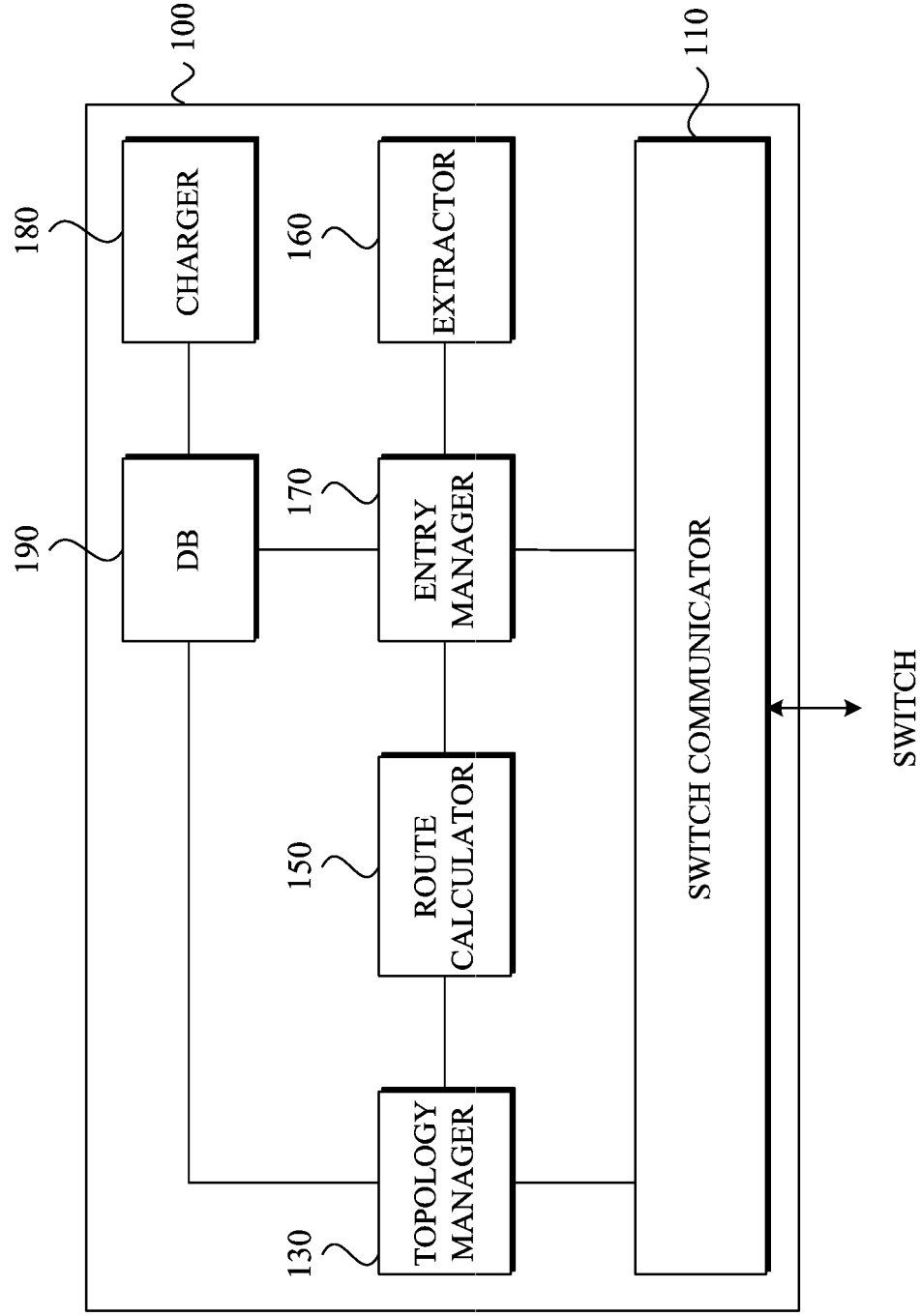
FIG. 5 is a block diagram of a controller according to another exemplary embodiment of the present invention.
Figure 6:
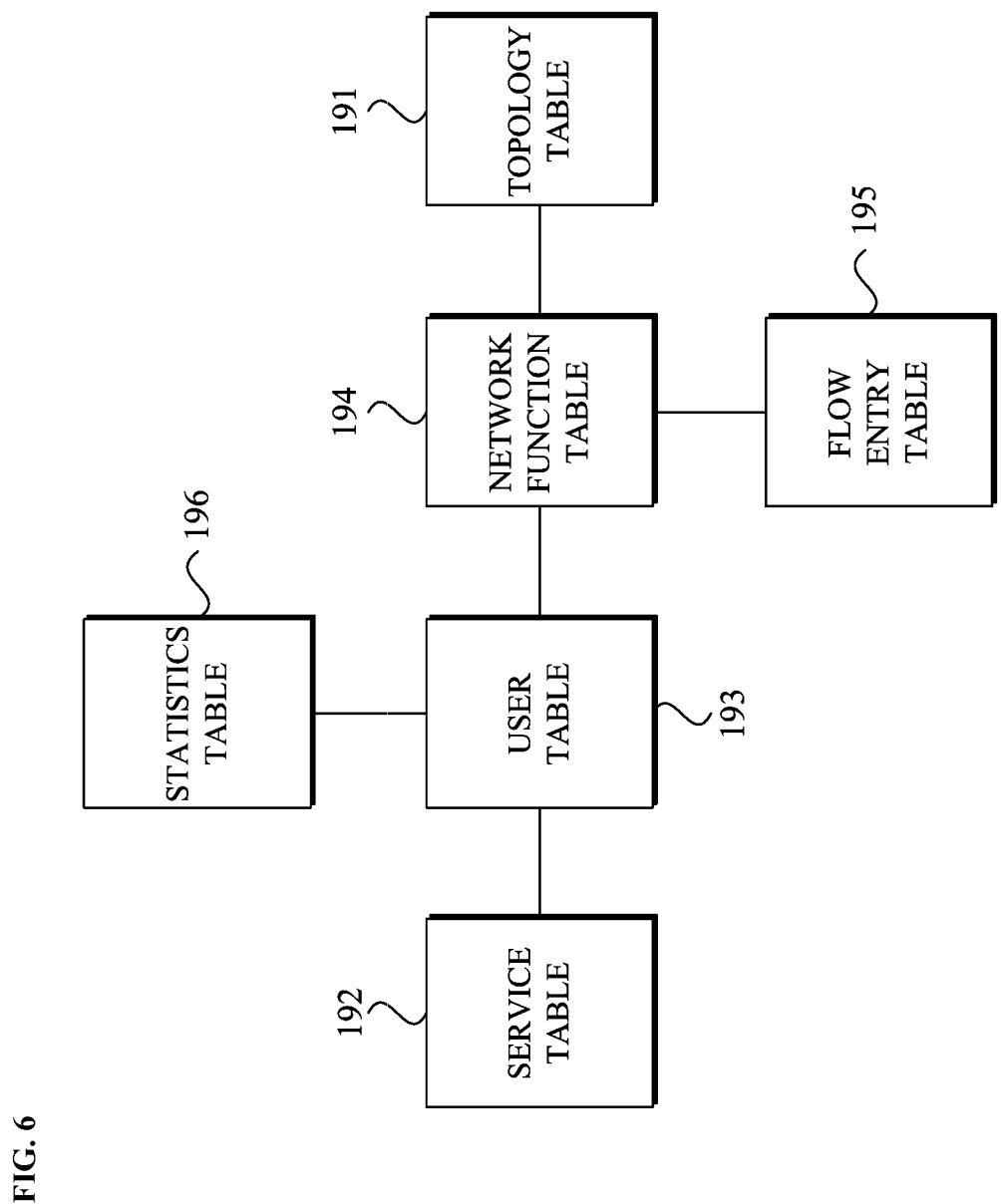
FIG. 6 is a block diagram illustrating a database according to an exemplary embodiment of the present invention.
Figure 7:
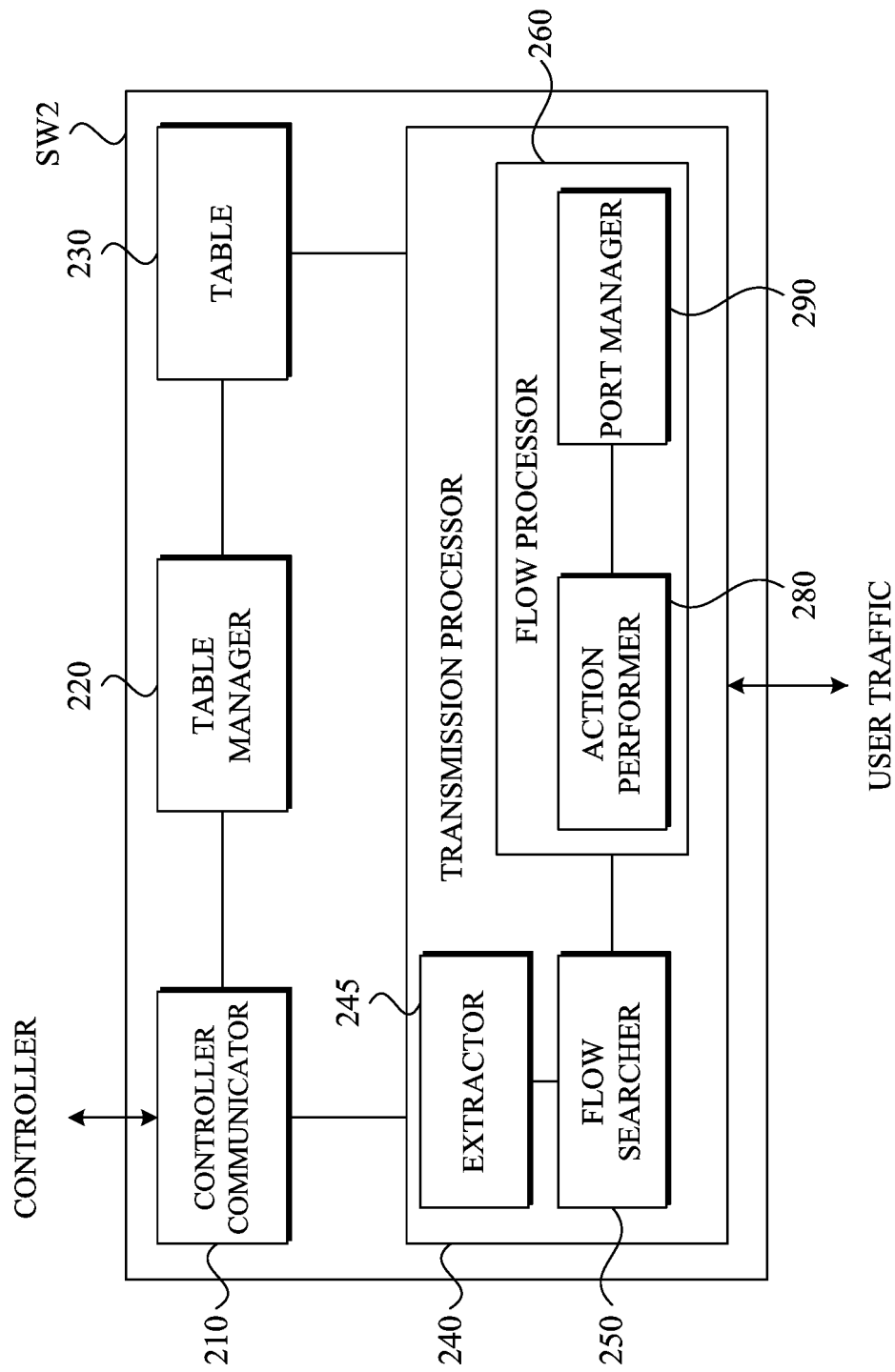
FIG. 7 is a block diagram illustrating a switch according to another exemplary embodiment of the present invention.
Figure 8:
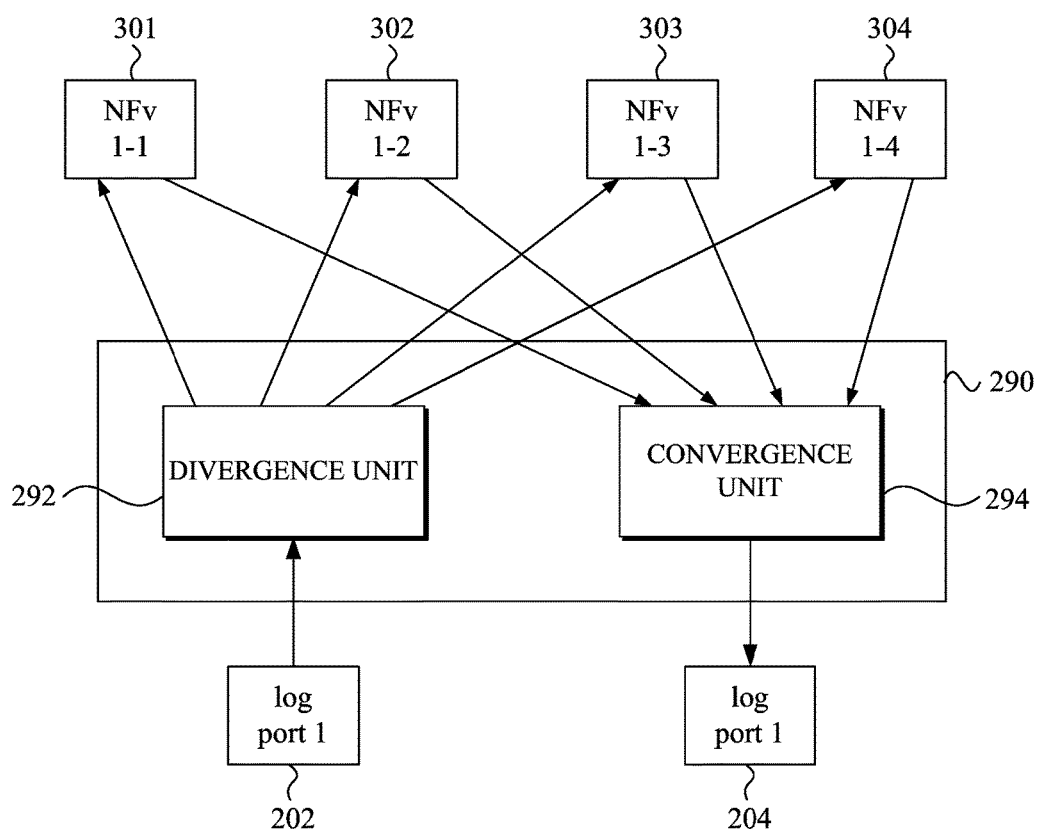
FIG. 8 is a block diagram illustrating a port manager according to an exemplary embodiment of the present invention.

FIG. 4 is a block diagram illustrating an SDN system according to another exemplary embodiment of the present invention; FIG. 5 is a block diagram of a controller according to another exemplary embodiment of the present invention; FIG. 6 is a block diagram illustrating a database according to an exemplary embodiment of the present invention; FIG. 7 is a block diagram illustrating a switch according to another exemplary embodiment of the present invention; and FIG. 8 is a block diagram illustrating a port manager according to an exemplary embodiment of the present invention.

Referring to FIG. 4, the network system may include a controller 10, a plurality of SDN switches (SW1, SW2, and SW3) 20, a plurality of network devices (UE, NF1, NF2, NF3, NF4, NF5, and NF 6) 35, 40 and 85, and an orchestrator 50. FIG. 1 to FIG. 3 will also be referenced in the following description of the exemplary embodiments of the present invention.

The network device may include a user terminal device 35 and network functions (NFs; NF1 to NF6) 40 that execute specified functions.

The NFs 40 are devices to provide individual functions for service chaining, and may be preferably, but not necessarily, virtual devices to ensure flexibility, scalability, and stability.

The user terminal device 35 is a device that requests data or information, and may include a personal computer (PC), a server, a client, and any type of terminal with a mobile communication capability.

The controller 10 is a type of command computer that controls the SDN system, and may perform various, complex functions, for example, routing, policy statement, and security check. The controller 10 may define a flow of packets generated in the plurality of SDN switches 20 at a lower level. For the flow allowed by the network policy, the controller 10 may calculate a route for the flow to take with reference to the network topology, and allow an entry for said flow to be set on the route. The controller 10 may communicate with the SDN switches 20 using a particular protocol, for example, OpenFlow protocol. Communication channels between the controller 10 and each SDN switch 20 may be encrypted with secure sockets layer (SSL).

Referring to FIG. 5, the controller 10 may include a switch communicator 110 to communicate with the SDN switches 20, a topology manager 130 to establish and manage network topology information, a route calculator 150, an extractor 160, an entry manager 170, a charger 180, and a database DB 190.

The extractor 160 may extract both a service identifier that identifies a requested service and a user identifier that identifies a service-requesting user from a packet-in message received from the switch communicator 110.

The packet-in message refers to a message that is sent from the SDN switch 20 to the controller 10 to request the controller 10 to calculate a path of an unknown packet when the SDN switch 20 receives the unknown packet, the message carrying the received packet or the whole or part of a copy of the packet.

The service identifier indicates a type of service provided by the network. Types of services may include web-traffic, video traffic, social network service (SNS) traffic, and so on. The service identifier may be defined beforehand by the user terminal device 35 that requests the service, or a gateway that transmits traffic to the SDN network or an edge switch in the SDN network may define the service identifier in a request packet. The definition of a service identifier may be made by allocating the service identifier to a specific field among predefined fields of a service request packet, or by adding metadata that indicates a type of service to the service request packet. To indicate the type of service, it may be preferable to tag the service identifier to the virtual local area network (vLAN) field of packet fields. vLAN is a technology used to logically configure a LAN regardless of physical arrangement and enables a network to be configured differently according to each service request by a user. The vLAN enables a separate network to be configured, thereby increasing the security of network resources, allowing the cost reduction, and facilitating the administrator for the network configuration operations, and as different network groups are formed, unnecessary traffic can be reduced.

It may be preferable that the SDN switch 20, particularly, an edge switch SW1, performs vLAN tagging. The edge switch SW1 may perform vLAN tagging that corresponds to the service type according to a user IP and a destination IP that are acquired from the packet. That is, the vLAN tagging of a service identifier has to be executed before the packet is forwarded to the controller 10, so that the extractor 160 can extract the service identifier.

The extractor 160 may extract the user identifier preferably, but not necessarily, from a user (source) IP (src IP) of the packet.

Referring to FIG. 6, the database 190 may include a topology table 191, a service table 192, a user table 193, a network function table 194, a flow entry table 195, and a statistics table 196.

The topology table 191 may store and manage both switch entries by the topology manager 130 and a topology that is link information between switches.

The service table 192 may store and manage service entries. The service entry allows a type of service provided by the SDN network to be distinguished from other types of services, and corresponds to a service ID.

The user table 193 may store and manage user entries. The user may be distinguished by the user IP.

The network function table 194 may store and manage a set of NF list entries for each service used by a user. That is, a network function order the NF list may be fixed or may be dynamically changed with reference to a topology state or a traffic processing state. The determination of NF list of NF functions for each service and each user may be made according to service level agreement between a service provider and the user.

The network function table 194 may further include a default NF list entry that is not associated with the service table 192 and the user table 193. The default NF list entry may be preferably a list of essential NFs of the SDN network that process the received packet.

The flow entry table 195 shows entries of appropriate packet paths created based on the topology table 191, the service table 192, the user table 193, and the network function table 194.

The statistics table 196 may store and manage statistics of flows, such as the amount of traffic of each flow, processing speeds, the number of NFs that each flow passes through, and the types of flows.

The route calculator 150 may obtain a packet transmission path received through the switch communicator 110 and an action column to be executed on the switch 20 on the transmission path, based on the network topology information established by the topology manager 130.

The entry manager 170 may register the calculation result from the route calculator 150 in the flow entry table 195 as a flow entry, and the entry manager 170 may respond to a request from the switch 10 to add or update a flow entry or entries.

The charger 180 may charge per user based on data of the statistics table 196 according to policies.

The SDN switch 20 may include one flow table or multiple flow tables for pipeline processing which is specified in non-patent document 1. To this end, as illustrated in FIG. 3, the first SDN switch SW1 20 may include the controller communicator 210, the table manager 220, and the transmission processor 240 which includes the instruction performer 270 and the action performer 280.

Referring to FIG. 7, the second SDN switch SW2 20 according to another exemplary embodiment of the present invention may further include a port manager 290. The port manager 290 may map a logical port of the SDN switch 20 to a physical port. The port manager 290 may manage a packet to be forwarded by the action performer 280 to the logical port of the switch SW2.

Referring to FIG. 8, the port manager 290 may include a divergence unit 292 and a convergence unit 294.

The divergence unit 292 may connect one logical port 202 and a plurality of physical port. At least some of the plurality of physical ports may be connected with at least one of NFv 301, 302, 303, and 304. In the present exemplary embodiment, the plurality of NFv 301 to 304 may be NFv that provide the same network function. The divergence unit 292 may forward a packet incoming through a first logical port 202 of the switch SW2 to an appropriate NFv via a physical port by taking into consideration a connection state and traffic state of each port. The generation and deletion of an NFv connected to the switch SW2 may be performed by the orchestrator 50. The orchestrator 50 may adjust the number of NFv to be connected to one logical port according to the traffic state and the like.

The convergence unit 294 may allocate a logical port 204 to packets incoming from the plurality of NFv 301 to 304.

By using the divergence unit 292 and the convergence unit 294, the port manager 290 may make internal physical ports of the SDN switch 20 unrecognizable to the other internal components of the SDN switch 20 or the controller 10. Hence, the controller 10 and the SDN switch 20 only needs to know the the type of NFv on the packet path and does not need to consider the physical ports according to the number of NFv.

The network system according to the present invention may further include a base station 25 that relays the user terminal device 35 and the switch SW1. The base station 25 according to the present exemplary embodiment may provide wireless connection between the user terminal device 35 and the switch SW1. The base station 25 may include evolved node B (eNB) of Long Term Evolution (LTE) communication network.

In the eNB that has received an IP packet from the user terminal device (hereinafter, referred to as a "UE") 35, capsuling is performed in which the GTP header, the UDP header, and the IP header for GTP tunneling are added in the front of the "packet sent from UE 35." Because the capsuling prevents the IP address of the UE 35, which is an original sender, from being exposed to the outside, the extractor 245 of the SDN switch 20 or the extractor 160 of the controller 10 is not able to extract user identification information from the capsuled packet. Hence, the switch SW1 may be preferably connected to the NF1 with a de-capsulation capability that can de-capsulate the packet received through the base station 25. The NF1 with a de-capsulation capsulation capability may add a header that contains a user IP and a destination IP to the packet received from the switch SW1, while simultaneously adding the header as metadata, and then send the resulting packet back to the switch SW1.

The switch SW1 may be connected to a mobile core network 80 and a public Internet 90. The switch SW1 can be operated with the public Internet 90 of a relatively low cost without passing through the mobile core network 80, and NFs, such as a firewall, IDS, and load balancer, placed in the existing mobile core network 80 are operated near the user, so that it is possible to reduce the load of the mobile core network 80.

The SDN switch SW1 may be directly connected to a gateway switch 27. The gateway switch 27 may enable a domain of a data center network 85 and a domain of the SDN switch SW1 to appear as the same domain, so that the service chain by the network functions NF4 to NF6 of the data center network 85 can be used.

Figure 9:
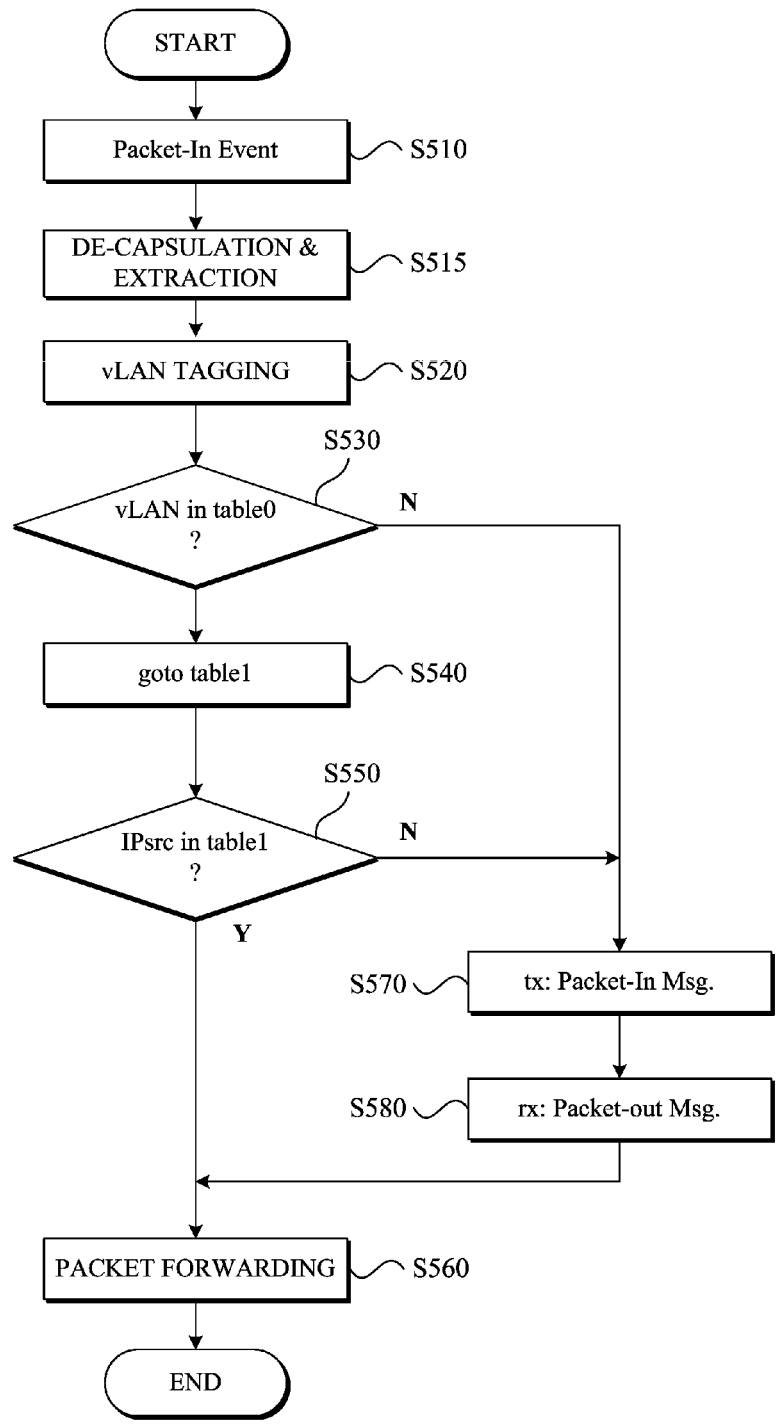
FIG. 9 is a flowchart illustrating a method of an SDN switch to provide service chaining according to an exemplary embodiment of the present invention.

FIG. 9 is a flowchart illustrating a method of an SDN switch to provide service chaining according to an exemplary embodiment of the present invention. FIGS. 1 to 8 will also be referenced in the following description of the exemplary embodiment of the present invention.

Referring to FIG. 9, in S510, the first SDN switch SW1 of an edge switch end recognizes a packet-in event when receiving a service request packet from the UE 35.

In the case where the first SDN switch SW1 is connected to the base station 25, the first SDN switch SW1 may extract source and destination IP addresses from a capsuled packet, as depicted in S515. To obtain the source and destination IP addresses of the capsuled packet, the first SDN switch SW1 may be preferably connected to an NF with a de-capsulation capability, as described above.

In S520, the first SDN switch SW1 may analyze the service request packet and, according to a service type of the packet, allocate a value that corresponds to a service type to vLAN of the service request packet.

The first SDN switch SW1 may search flow table 0 to find an entry that matches the vLAN of the service request packet, as depicted in S530. If there is a matching flow entry, an instruction may compare the packet with the next flow table 1, as depicted in S540, so that it may be determined whether there is a flow entry that matches an IP of a source in table 1, as depicted in S550. If there is a matching flow entry, the first SDN switch SW1 may execute an action or action set of the flow entry to forward the service request packet to a specified port, as depicted in S560.

If the flow entry that matches the vLAN of the service request packet is not found in flow table 0, the first SDN switch SW1 may send a packet-in message to the controller 10 at a higher layer, as depicted in S570, and then receive from the controller 10 a packet-out message that carries information used to send a packet, as depicted in S580. The first SDN switch SW1 may receive a flow modification message in addition to the packet-out message. When receiving the flow modification message, the first SDN switch SW1 may register a flow entry carried by the flow modification message in the flow table.

Unlike the service chaining method of the first SDN switch SW1 with the internal block as illustrated in FIG. 3, in response to the occurrence of a packet-in event, as depicted in S510, the second SDN switch SW2 of the core network may search for an entry that matches vLAN, as depicted in S520. This is because de-capsulation, extraction, and vLAN tagging are carried out in the first SDN switch SW1. In the case where the received flow carries path identification information, the second SDN switch SW2 may determine whether the entry DB has a flow entry that corresponds to path identification information that is not vLAN or a source IP. A flow entry that carries the path identification information in the match field may be generated by the controller 10. The packet forwarding by the flow entry of the second SDN switch SW2 with the internal configuration as illustrated in FIG. 7 may be preferably directed to a logical port.

Figure 10:
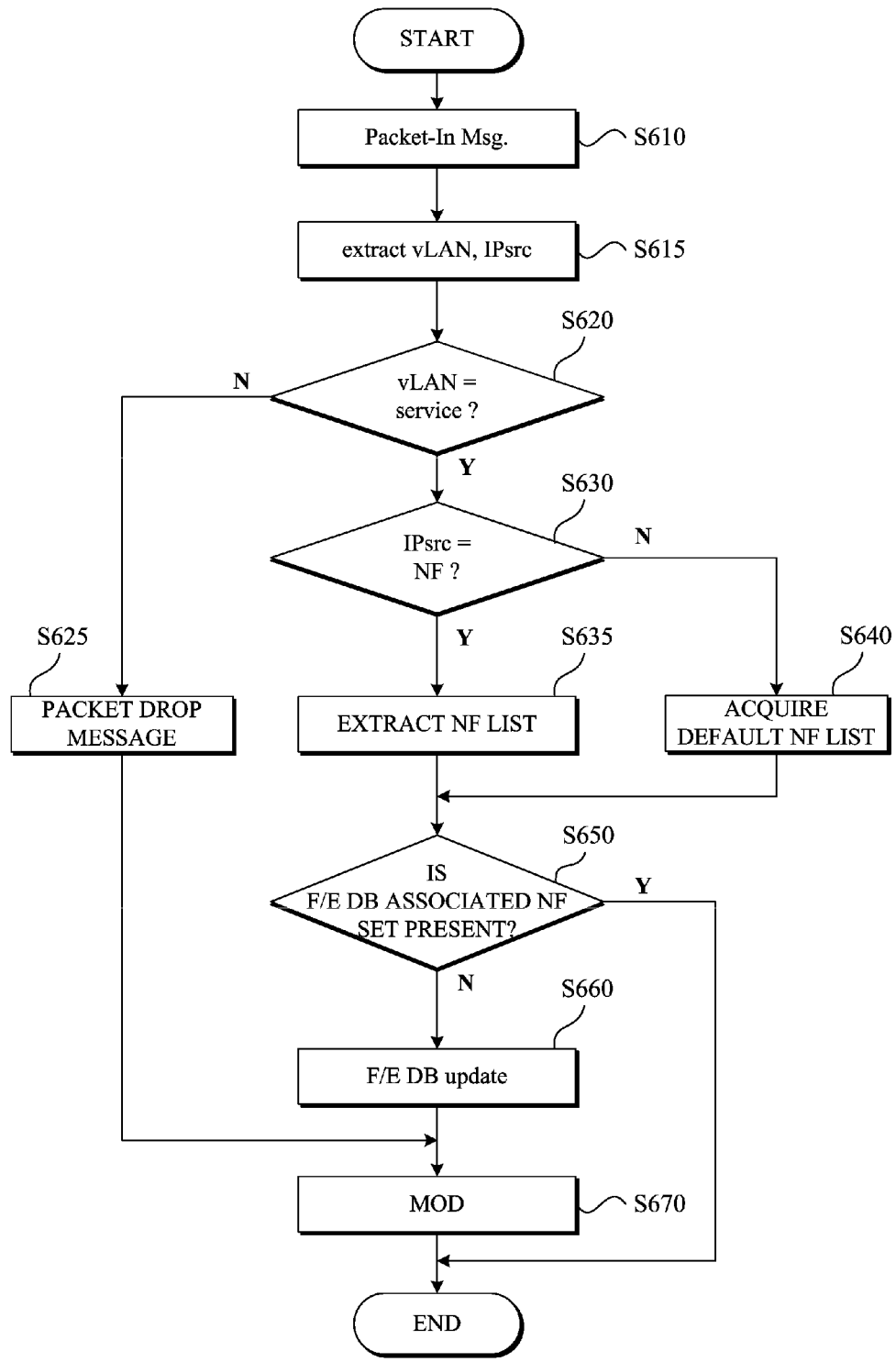
FIG. 10 is a flowchart illustrating a method of a controller to provide service chaining Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 10 is a flowchart illustrating a method of a controller to provide service chaining FIGS. 1 to 9 will also be referenced in the following description of the exemplary embodiment of the present invention.

Referring to FIG. 10, in S610, the controller 10 may receive a packet-in message from the SDN switch 20.

In response to receiving the packet-in message, the controller 10 may extract vLAN and source IP from a packet of the packet-in message in order to obtain a service ID and a user ID, as depicted in S615. However, when the packet-in message contains path identification information, the controller 10 may not extract the vLAN and the source IP, but may search for a flow entry that enables the path identification information to be allocated to the packet and send the found flow entry to the SDN switch 20, as depicted in S670.

In S620, the controller 10 may determine whether a service that corresponds to the vLAN of the received packet is present in the service table 192. If the service that corresponds to the vLAN is not present in the service table 192, the controller 10 may transmit message-out to a lower switch to drop the packet, as depicted in S625. Thereafter, the controller 10 may manage a packet transmission failure by sending a report to the administrator or performing error process routine.

If the service that corresponds to the vLAN is present in the service table 192, the controller 10 may determine whether a user (i.e., a source IP) associated with the service is present in the user table 193, as depicted in S630. If the user associated with the service that corresponds to the vLAN is present, an NF list associated with the user may be acquired in S635. Otherwise, a default NF list may be acquired in S640. The controller 10 may determine whether a flow entry associated with the NF list is present in the database 190. If the associated flow entry is present, the controller 10 may update the database 190, as depicted in S660. The flow entry associated with the NF list may be preferably a calculation result according to a packet path calculated based on the NF list, topology information and a traffic state.

The controller 10 may send a flow modification message to send the flow entry to the SDN switch 20 on the corresponding path.

According to the present invention, since the network is operated automatically and dynamically, a degree of freedom in network design is high. A logical port-based network function is provided, so that it is possible to effectively manage network function entries according to connectivity of ports and traffic state as well as high scalability and flexibility are ensured, and when a link is down, an alternative path can be easily and automatically identified. In addition, in the case of mobile traffic, as the tunneling is established between an access network and a core network, it is not possible to identify IP information of the user. Whereas, according to the present invention, information about a packet capsuled by tunneling can be obtained by using the network functions, and SDN-based service chain is provided at an access end of a mobile network, thereby reducing the load of the mobile network while improving the user experience.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for providing service chaining in a software-defined network (SDN)-based network system which comprises a plurality of switches and a controller to control the plurality of switches, the method comprising:
receiving, at the controller, a first packet-in message from a first switch of the plurality of switches, which has received a service request packet from a user, to indicate that the first switch does not have a corresponding entry in a field extracted from the service request packet;
extracting from the packet-in message both a service identifier that identifies a type of a service requested through the service request packet and a user identifier that identifies the user;
searching an entry database (DB) for an entry list that enables the service request packet to be forwarded to a network function list that corresponds to the service identifier and the user identifier, with reference to a service table, a user table, and a network function table which are associated with one another; and
in response to an entry DB search result that a packet forwarding entry of the service request packet is not present in the entry DB, updating the entry DB with reference to a topology table such that a path for forwarding the service request packet is generated in the network function list.

2. The method of claim 1, further comprising:
sending a first flow modification message to the first switch based on the entry list that enables the service request packet to be forwarded to the network function list of the entry DB.

3. The method of claim 2, further comprising:
sending a second flow modification message to a second switch of multiple switches, exclusive of the first switch, on the path for forwarding the service request packet based on the entry list that enables the service request packet to be forwarded to the network function list of the entry DB.

4. The method of claim 2, wherein the first flow modification message contains a request for generating in the first switch a flow entry that contains an instruction allowing an action to modify the service request packet in order to enable a path identifier to be extracted from the service request packet, the path identifier identifying the path which allows the service request packet to be forwarded to the network function list.

5. The method of claim 4, further comprising:
determining, at a third switch that has received the modified service request packet from which the path identifier can be extracted, whether a flow entry that corresponds to the path identifier.

6. The method of claim 1, further comprising:
in response to a search result that a service that corresponds to the service identifier is not present in the service table, processing an error,
wherein the processing of error comprises updating the entry DB so as to drop the service request packet.

7. The method of claim 1, wherein the service identifier is associated with a vLAN field of the service request packet and the user identifier is associated with a source IP address of the service request packet.

8. The method of claim 1, wherein the service request packet received by the first switch is a capsuled packet to which an additional header is added to an original packet of a terminal of the user by at least one device in a mobile communication network between the first switch and the terminal of the user, and
wherein the method further comprises sending, at the first switch, the service request packet to a packet de-capsulation network function which is connected to the first switch and extracts the service identifier and the user identifier from a header of the original packet.

9. The method of claim 8, further comprising:
extracting, at the packet de-capsulation network function, both the service identifier and the user identifier;
adding the extracted identifiers to the service request packet; and
sending the service request packet to which the extracted identifiers are added to the first switch.

10. The method of claim 1, wherein a fourth switch of the plurality of switches is connected to at least one first network function having a first function of the network function list via an output logical port and an input logical port, and
wherein the method further comprises outputting, at the fourth switch, a packet incoming from the first switch through the output logical port based on an entry table of the fourth switch.

11. The method of claim 10, further comprising:
sending, at the fourth switch, a packet, which has been received via the input port from the first network function based on the entry table of the fourth switch, to a fifth switch having a second function of the network function list.

12. The method of claim 10, further comprising:
adjusting, at an orchestrator that manages the plurality of switches and the controller, the number of first network functions connected to the input port and the output port of the fourth switch based on at least network state.

13. The method of claim 10, further comprising:
receiving, at the controller, statistics from the plurality of switches, the statistics containing the user identifier and a packet transmission amount of a network function that is associated with the user identifier; and
charging per user identifier based on the received statistics.

14. An SDN controller connected to a plurality of SDN-based switches via OpenFlow protocol and controlling the plurality of switches, the SDN controller comprising:
a switch communicator configured to receive a first packet-in message from a first switch of the plurality of switches, which has received a service request packet from a user, to indicate that the first switch does not have a corresponding entry in a field extracted from the service request packet;
an identifier extractor configured to extract from the packet-in message both a service identifier that identifies a type of a service requested through the service request packet and a user identifier that identifies the user;
a service table enumerating services available to be provided;
a user table comprising a plurality of user list, each user list being associated with each available service in the service table;

a network function table comprising a plurality of network function lists, each network function list being associated with each user list of the user table;

a topology table comprising information about a network topology;

an entry DB configured to store entries that define packet forwarding to be performed in the plurality of switches; and an entry manager configured to determine whether an entry list that enables the service request packet to be forwarded to a network function list that corresponds to both the service identifier and the user identifier is present in the entry DB, with reference to a service table, a user table, and a network function table which are associated with one another.

15. The SDN controller of claim 14, wherein the entry manager is configured to, in response to a determination that a packet forwarding entry of the service request packet is not present in the entry DB, update the entry DB with reference to a topology table such that a path for forwarding the service request packet is generated in network functions that implement functions of the network function list.

16. The SDN controller of claim 15, wherein the entry manager is configured to send a first flow modification message to the first switch based on the entry list that enables the service request packet to be forwarded to the implemented network functions of the network function list of the entry DB.

17. The SDN controller of claim 14, wherein one of the plurality of switches connected to the switch communicator is a gateway switch that enables a data center network to appear as the same domain as the plurality of switches.

* * * * *